United States Patent
Peri et al.

(10) Patent No.: US 12,354,223 B2
(45) Date of Patent: Jul. 8, 2025

(54) SYSTEM AND METHOD FOR ADAPTIVE VOLUME-BASED SCENE RECONSTRUCTION FOR XR PLATFORM

(71) Applicant: Samsung Electronics Co., Ltd., Suwon-si (KR)

(72) Inventors: Christopher A Peri, Mountain View, CA (US); Divi Schmidt, Berkeley, CA (US); Yingen Xiong, Mountain View, CA (US); Lu Luo, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 146 days.

(21) Appl. No.: 17/714,866

(22) Filed: Apr. 6, 2022

(65) Prior Publication Data
US 2023/0215108 A1   Jul. 6, 2023

Related U.S. Application Data

(60) Provisional application No. 63/295,600, filed on Dec. 31, 2021.

(51) Int. Cl.
| | |
|---|---|
| *G06T 19/00* | (2011.01) |
| *G06T 15/08* | (2011.01) |
| *G06T 15/40* | (2011.01) |
| *G06T 17/20* | (2006.01) |

(52) U.S. Cl.
CPC ........... *G06T 19/006* (2013.01); *G06T 15/08* (2013.01); *G06T 15/40* (2013.01); *G06T 17/205* (2013.01)

(58) Field of Classification Search
CPC .................................................. G06T 19/006
See application file for complete search history.

(56) References Cited

U.S. PATENT DOCUMENTS

| | | |
|---|---|---|
| 8,587,583 B2 | 11/2013 | Newcombe et al. |
| 10,861,217 B2 | 12/2020 | Moloney et al. |
| 10,891,779 B2 | 1/2021 | Nguyen |
| 10,922,526 B2 | 2/2021 | Blondel et al. |
| 11,055,909 B2 | 7/2021 | Kobayashi |

(Continued)

FOREIGN PATENT DOCUMENTS

| | | |
|---|---|---|
| CN | 106856012 B | 6/2018 |
| CN | 108961390 A | 7/2018 |

(Continued)

OTHER PUBLICATIONS

Simsangcheol (2023) Truncated signed distance function, Medium. Available at: https://medium.com/@sim30217/truncated-signed-distance-function-f765a0f1d432 (Year: 2003).*

*Primary Examiner* — Shivang I Patel

(57) ABSTRACT

A system and method for adaptive volume-based scene reconstruction for XR platform application are provided. The system includes an image sensor and a processor to perform the method for display distortion calibration. The method includes determining a processor computation load. The method also includes, based on the determined computation load, adjusting one or more parameters for the 3D scene reconstruction to compensate for the determined computation load. The method further includes rendering a reconstructed 3D scene.

17 Claims, 8 Drawing Sheets

(56) References Cited

U.S. PATENT DOCUMENTS

| | | | |
|---|---|---|---|
| 2003/0194121 A1* | 10/2003 | Eberhard | A61B 6/502 382/132 |
| 2018/0315232 A1* | 11/2018 | Jones | G06T 17/205 |
| 2019/0188899 A1* | 6/2019 | Moloney | G06N 3/04 |
| 2021/0042988 A1 | 2/2021 | Molyneaux et al. | |
| 2021/0190497 A1 | 6/2021 | Derhy et al. | |
| 2021/0279943 A1 | 9/2021 | Murez | |
| 2021/0327155 A1 | 10/2021 | Powers et al. | |

FOREIGN PATENT DOCUMENTS

| | | |
|---|---|---|
| CN | 106875482 B | 4/2020 |
| KR | 10-2021-0075379 A | 6/2021 |
| WO | 2021082771 A1 | 5/2021 |

\* cited by examiner

SYSTEM AND METHOD FOR ADAPTIVE VOLUME-BASED SCENE RECONSTRUCTION FOR XR PLATFORM

CROSS-REFERENCE TO RELATED APPLICATION AND CLAIM OF PRIORITY

This application claims priority under 35 U.S.C. § 119(e) to U.S. Provisional Patent Application No. 63/295,600 filed on Dec. 31, 2021. The above-identified provisional patent application is hereby incorporated by reference in their entireties.

TECHNICAL FIELD

This disclosure relates generally to computer vision and platforms for augmented reality (AR) and extended reality (XR). More specifically, this disclosure relates to a system and method for adaptive volume-based scene reconstruction for XR platform applications.

BACKGROUND

Augmented reality and extended reality experiences, which incorporate digitally controlled content into a user's view of an operating environment (e.g., a real-world environment) through an AR or XR apparatus (for example, a head-mounted display) present unique challenges in terms presenting images from real world and digital sources. Extended reality devices may display a combination of images from the real world and images from the virtual world.

Scene reconstruction is important for XR platform and applications. Spatial mapping can be created with scene reconstruction and comprehension, which enables AR virtual objects to interact with a real-world, natural scene. Spatial mapping also involves artificial intelligence (AI) in the pipeline for operating the virtual objects. An accurate spatial mapping can create a proper overlap between the virtual objects and the natural scene in 3D space, such that the virtual objects look as if they were originally part of the scene.

SUMMARY

This disclosure provides a system and method for adaptive volume-based scene reconstruction for XR platform applications.

In a first embodiment, a method is provided. The method includes performing, by a processor of an electronic device, a three-dimensional (3D) scene reconstruction for an extended reality application. The method also includes determining a processor computation load. The method also includes, based on the determined computation load, adjusting one or more parameters for the 3D scene reconstruction to compensate for the determined computation load. The method further includes rendering a reconstructed 3D scene.

In a second embodiment, an apparatus is provided. The apparatus includes an image sensor and a processor. The processor is configured to perform a three-dimensional (3D) scene reconstruction for an extended reality application. The processor also is configured to determine a processor computation load. The processor also is configured to, based on the determined computation load, adjust one or more parameters for the 3D scene reconstruction to compensate for the determined computation load. The processor is further configured to render a reconstructed 3D scene.

In a third embodiment, a non-transitory computer-readable medium is provided. The non-transitory computer-readable medium contains instructions that, when executed by a processor, cause the processor to: perform a three-dimensional (3D) scene reconstruction for an extended reality application; determine a processor computation load; based on the determined computation load, adjust one or more parameters for the 3D scene reconstruction to compensate for the determined computation load; and render a reconstructed 3D scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

3D scene reconstruction can be a time-consuming step in an AR pipeline. On a mobile platform, while the AR pipeline performs 3D scene reconstruction, the mobile platform also runs other processes simultaneously to maintain normal operation of the mobile device. The computational power and resources for 3D reconstruction changes in the AR pipeline. When other processes of the mobile device use more resources, 3D scene reconstruction may be allocated fewer resources. When other processes of the mobile device use less resources, 3D scene reconstruction may be allocated more resources.

To enable the AR pipeline to operate normally in an environment in which the allocated resources may be changing, embodiments of the present disclosure provide a 3D scene reconstruction algorithm that can adapt the AR pipeline to the resource changes, such that the changes in allocated resources do not block the entire AR pipeline when the available computational resources are reduced for the 3D scene reconstruction algorithm. Embodiments of the present disclosure further create a 3D scene reconstruction algorithm that can adaptively adjust the requirements of the computational resources and memory. Certain embodiments enable a tradeoff between processing speed and an accuracy of the result. When more computational resources are available, the disclosed processes and algorithm can generate results with higher-resolution and higher-accuracy. When less computational resources are available, the disclosed processes and algorithm generates results with lower-resolution and lower accuracy. Certain embodiments manage to maintain similar processing speed during available computational resource changes. As such, embodiments of the present disclosure provide an enhanced 3D scene reconstruction system, method, apparatus, and algorithm that improves 3D scene reconstruction in terms of both processing speed and accuracy for XR pipeline, especially on mobile devices.

Figure 1:
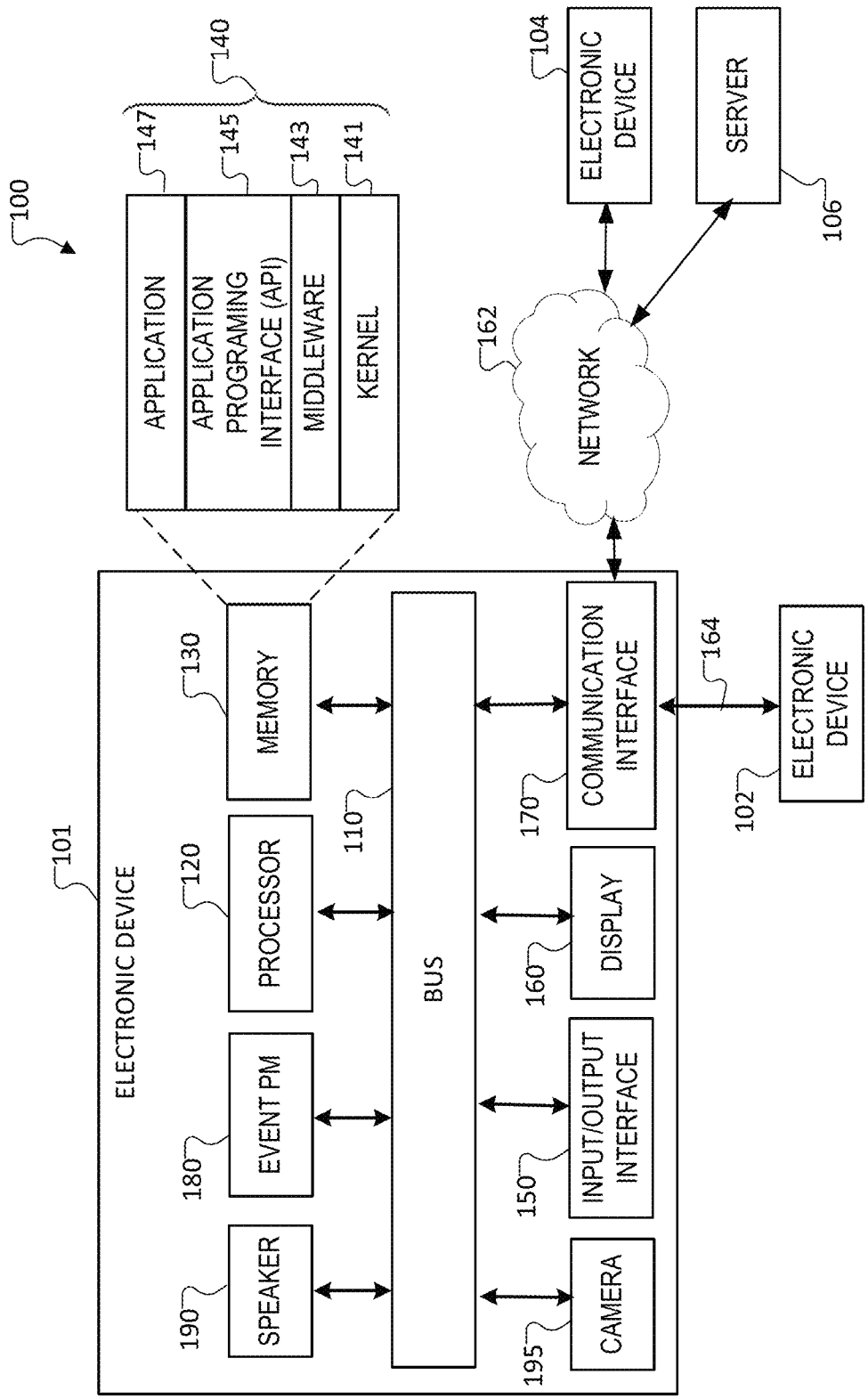
FIG. 1 illustrates an example network configuration including an electronic device according to embodiments of the present disclosure.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

In certain embodiments, electronic device 101 is operating as a platform for providing an XR experience according to some embodiments of this disclosure. According to various embodiments of this disclosure, electronic device 101 could be implemented as one or more of a smartphone, a tablet, or a head-mounted device (HMD) for providing an augmented reality (AR) experience. In some embodiments, electronic device 101 is a wearable device. In certain embodiments, electronic device 101 is configured to couple to a second electronic device 102, which may be a wearable device such as an HMD.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

Applications 147 can include games, social media applications, applications for geotagging photographs and other items of digital content, extended reality (XR) applications, operating systems, device security (e.g., anti-theft and device tracking) applications or any other applications which access resources of electronic device 101, the resources of electronic device 101 including, without limitation, speaker 190, microphone, input/output interface 150, and additional resources. According to some embodiments, applications 147 include applications which can consume or otherwise utilize identifications of planar surfaces in a field of view of visual sensors of electronic device 101.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. The communication interface 170 may include, for example, a radio frequency (RF) transceiver, a BLUETOOTH transceiver, or a wireless fidelity (WI-FI) transceiver, and the like.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The embodiment of device 100 illustrated in FIG. 1 is for illustration only, and other configurations are possible. The embodiment of the device 100 shown in FIG. 1 is for illustration only. It is further noted that suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on other platforms are within the contemplated scope of this disclosure.

Figure 2:
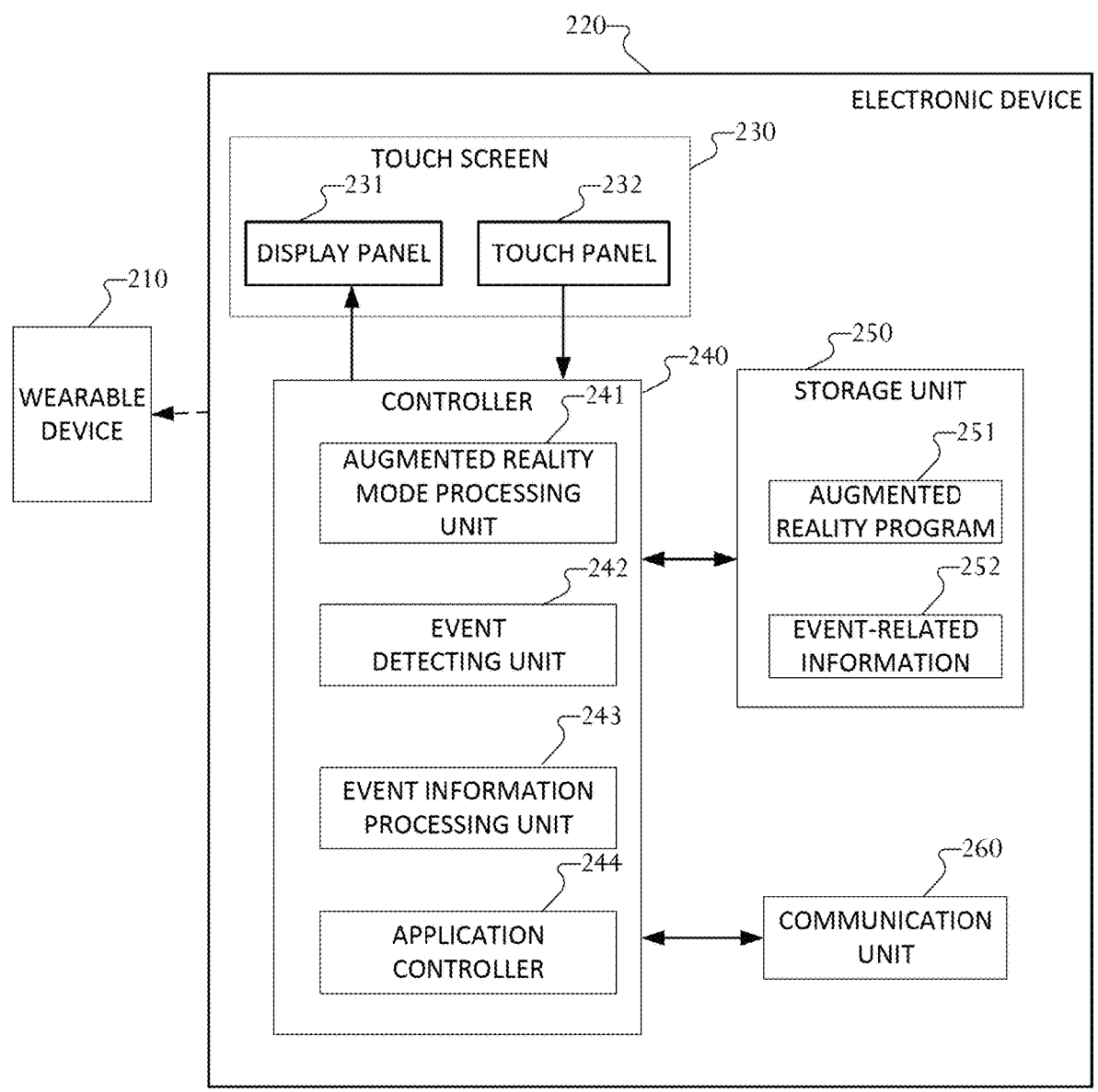
FIG. 2 illustrates an example electronic device according to embodiments of the present disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

In certain embodiments, an electronic device 220 is an HMD that includes display or touchscreen 230. In certain embodiments, the electronic device 220 includes display panel 231 without a touch screen option. According to various embodiments, the display panel 231 can display, in an internally facing direction (e.g., in a direction having a component that is opposite to arrow 201) items of XR content in conjunction with views of objects in an externally facing field of view. According to some embodiments, the display panel 231 is substantially transparent (similar to, for example, the displays used in "smart glasses" or "heads-up displays" on the cockpit glass of an airplane) and views of objects in externally facing fields of view come from light passing through display. According to various embodiments, (sometimes referred to as "mixed reality") the display panel 231 is opaque, and views of objects in externally facing fields of view come from image data from externally oriented cameras (for example, externally oriented camera 195).

In certain embodiments, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231 but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a WI-FI connection, a WI-FI disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected to a wearable device, the controller can perform control to run the augmented reality mode. According to certain embodiments, the controller can enable the event-related information to be arranged and processed to be displayed in a three-dimensional (3D) space of the augmented reality mode screen being displayed on a current display screen. According to certain embodiments, the electronic device 220 can include additional sensors such as depth sensors, one or more red, green, blue (RGB) cameras, dynamic vision sensor (DVS) cameras, 360-degree cameras, or a combination thereof.

Figure 3:
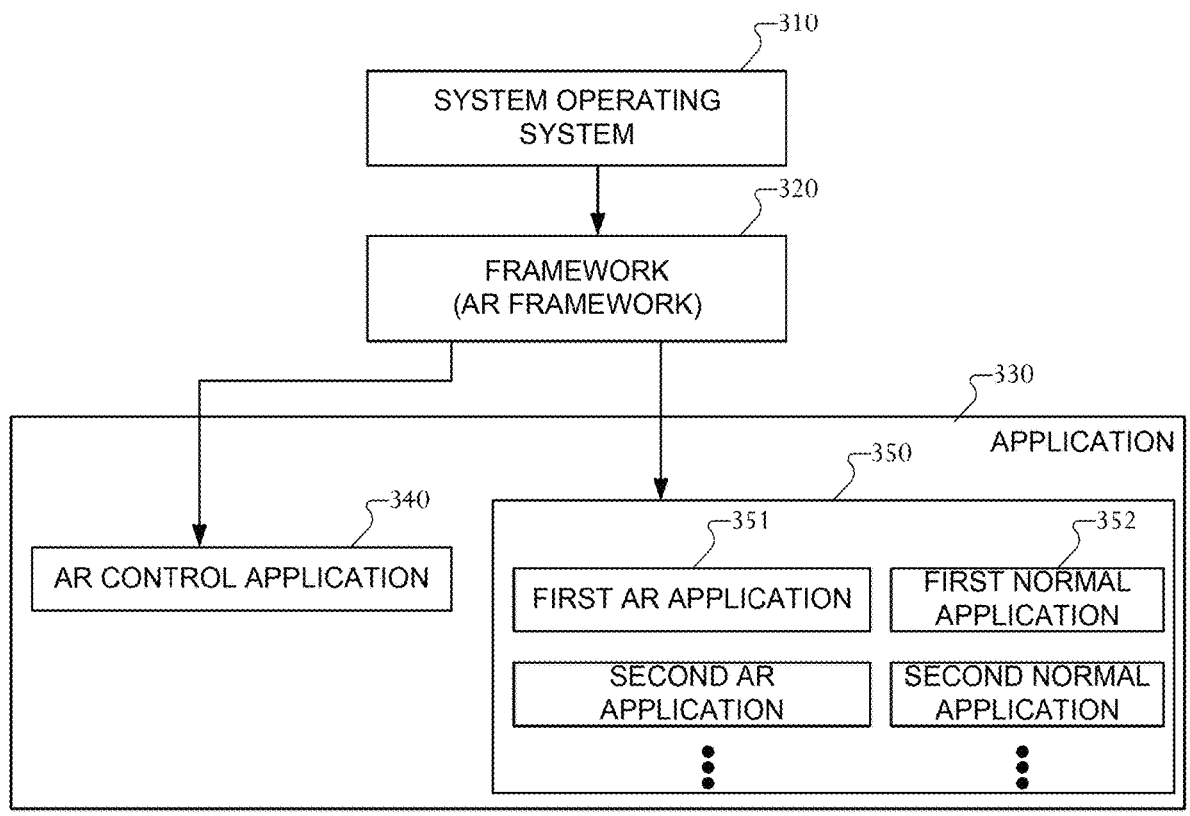
FIG. 3 is a block diagram illustrating a program module according to embodiments of the present disclosure.
Figure 4A:
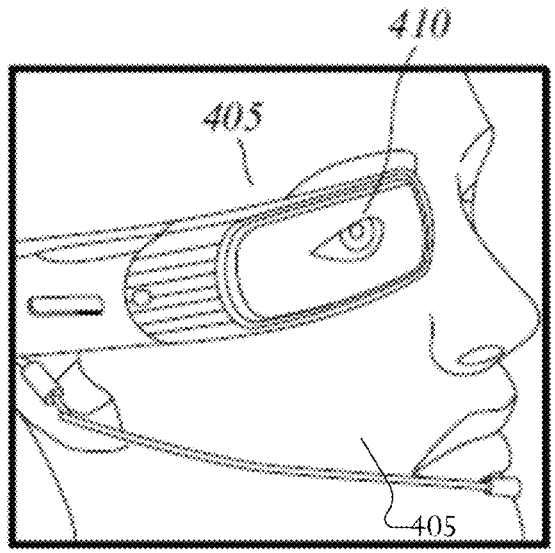
FIGS. 4A-4D illustrate examples of a head mounted display (HMD) for use in augmented reality, mixed reality, or virtual reality according to embodiments of the present disclosure.
Figure 4B:
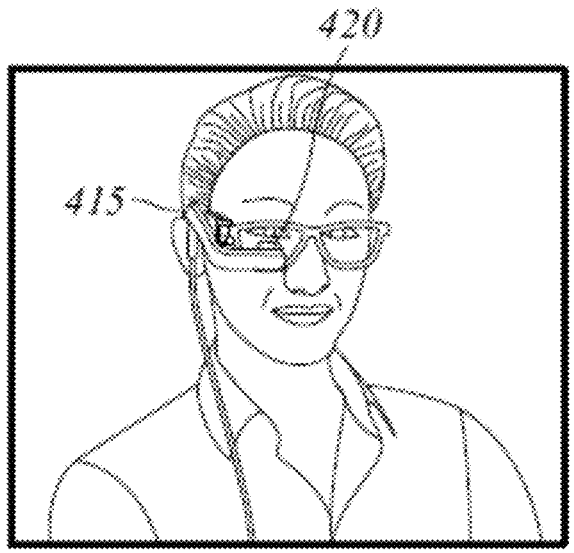
Figure 4C:
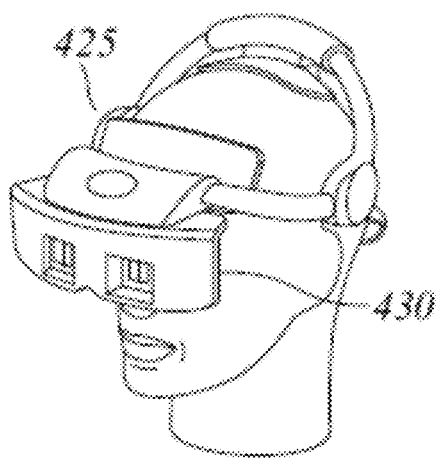
Figure 4D:
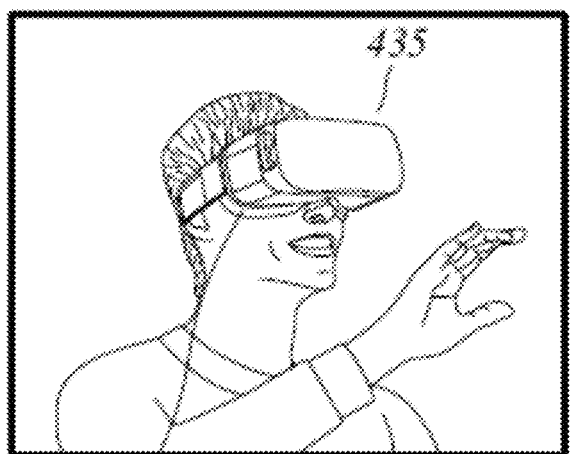

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to a virtual reality (VR) and the augmented reality (AR). Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a BLUETOOTH driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application 330 can include a plurality of applications and can include at least one AR application 351 running in the augmented reality mode and at least one normal application 352 running in a non-augmented reality mode, which is not the augmented reality mode.

The application 330 can further include an AR control application 340. An operation of the at least one AR application 351 and/or at least one normal application 352 can be controlled under the control of the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates on the background so as not to influence the screen by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In world elements are elements that move in relation to the real or virtual environment itself (i.e., move in relation to the environment itself). Depending on the object, in world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A-4D illustrate examples of a head mounted display (HMD) for use in augmented reality, mixed reality, or virtual reality according to an embodiment of this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see-through display 420. The non-see-through display 420 can be a liquid crystal display (LCD), a Light emitting diode (LED), active-matrix organic light emitting diode (AMO-LED), or the like. The non-see-through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see-through display 440. The HMD can include a camera or camera input configured to capture real-world information and display, via the non-see-through display 440, real-world information. The non-see-through display 440 can be an LCD, LED, AMOLED, or the like. The non-see-through display 440 can be configured to render images for viewing by the user. The real-world information captured by the camera can be rendered as a video image on the display with augmented information.

Embodiments of the present disclosure relate to a system and method for optical calibration of an HMD. A significant issue with the current technology is that deformations in image presentation may result extremely blurred image regions in some cases. The blurred image regions may cause nausea, dizziness or generally ill feelings in the user of the HMD. Certain embodiments of the present disclosure provide an algorithm to encode and decode distortions of pixels in images passing through a lens or multiple lenses. The image patterns can be different formats such as binary gray code patterns, color patterns. Certain embodiments of the present disclosure provide an algorithm to calibrate distortions with ray tracing approaches. The algorithm to calibrate distortions with ray tracing approaches maps pixels on the distorted panel to camera pixels and to ray directions for distortion computing. Certain embodiments of the present disclosure provide an algorithm to encode distortion and chromatic aberration with angular distortion for optical pipeline in the Field of View (FOV) space. Certain embodiments of the present disclosure provide algorithm to calibrate distortion center and a FOV with calibrated distortion.

Figure 5:
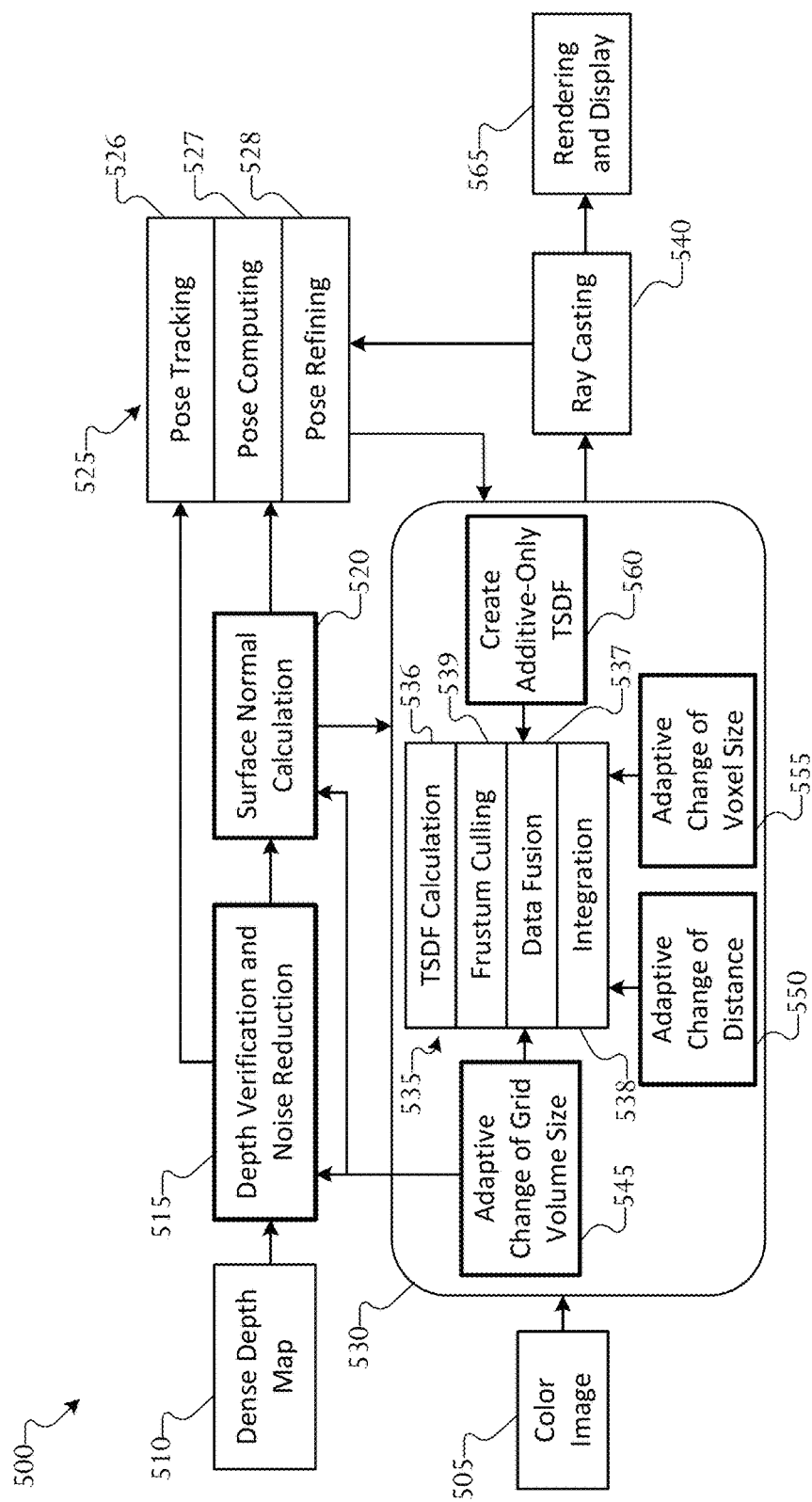
FIG. 5 illustrates a pipeline for adaptive volume-based scene reconstruction for XR platform and applications according to embodiments of the present disclosure.

FIG. 5 illustrates a pipeline for adaptive volume-based scene reconstruction for XR platform and applications according to embodiments of the present disclosure. While FIG. 5 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The AR pipeline 500 depicted can be implemented by one or more processors in a mobile electronic device, such as by one or more processors 120 of an electronic device 101.

Certain embodiments provide an adaptive volume-based scene reconstruction algorithm and pipeline that: dynamically adjusts a processing speed according to changes in available computing resources; and can return to normal processing speed and accuracy when available computing resources are normalized. By making a trade-off between processing speed and resulting accuracy, the algorithm and pipeline maintain a processing speed. The algorithm and pipeline are configured to dynamically change a reconstruction threshold (distance), a reconstruction grid volume size, a reconstruction voxel size. Certain embodiments further create additive-only Truncated Signed Distance Function (TSDF) by only considering voxels in truncation region to reduce computational loads and increate processing speed.

In the process for adaptive volume-based scene reconstruction for XR platform and applications, the AR pipeline 500 receives inputs comprising a color image 505 and dense depth map 510, such as from other sources. The color image 505 can be captured from a color camera, such as camera 195. In certain embodiments, the color image 505 is obtained from an external source. The dense depth map 510 can be created by one or more depth sensors and a structure from motion detected within color images 505. In certain embodiments, the depth map can be created via a machine learning depth map process performed on the color images 505. That is, a machine learning process, such as AI, can analyze the color images 505 and based on feature characteristics and motion within the color images 505, generate the dense depth map 510.

In operation 515, the processor 120 of electronic device 101 performs post processing on the dense dept map 510 using depth verification and noise reduction. The processor 120 uses the depth verification process to remove false positives and maintain actual ("real") depths. Then, the processor 120 performs a noise reduction with a special filtering, such as a bilateral filter, configured to remove noises and maintain edge information. The depth verification and noise reduction operation 515 outputs clarified depths.

In operation 520, in response to obtaining the clarified depths from operation 515, the processor 120 calculates a surface normal, which is to be used in scene reconstruction. The processor 120 computes a surface normal, such as by taking a vector cross product at two edges of an object, or grid points, based on associated depth info. The order of the vertices used in the calculation will affect the direction of the normal. In certain embodiments, to save computational power, the depth verification and surface normal calculation are performed only for the points on a reconstruction grid which will be dynamically adjusted as the reconstruction resolution changes.

Based on the clarified depths from operation 515 and surface normal information from operation 520, the processor 120 creates a camera pose in operation 525. The camera pose creation process includes pose tracking 526, pose computing 527, and pose refining 527. In certain embodiments, the processor 120 uses Iterative Closest Point (ICP) or simultaneous localization and mapping (SLAM) for pose tracking.

Additionally, the clarified depths from operation 515 and surface normal information from operation 520 are provided to a 3D reconstruction process 530. Based on a normal TSDF (Truncated Signed Distance Function) model 535, the processor 120 reconstructs TSDF function 536, fuses depth data from different frames 537, and integrates depth and color texture data together 538 to create volume-based 3D reconstruction. To speed up the integration process, the processor 120 performs frustum culling 539 in TSDF reconstruction. In certain situations, frustum culling can increase reconstruction speed substantially. In 3D computer graphics, a view frustum is a pyramid-shaped region that is rendered by a perspective of the camera. In frustum culling, one or more elements are removed from the information. That is, the processor 120 sorts visible and invisible elements and renders only visible elements. By performing frustum culling, the processor 120 can avoid expending processing power for elements that are not visible to the user.

The disclosed adaptive volume-based scene reconstruction AR pipeline 500 can dynamically adjust a processing speed according to the changes of available computational resources, such that the changes will not block the entire AR pipeline 500 while computational resources are reduced since other processes on device need more at some time. The AR pipeline 500 can reconstruction grid volume size 545, dynamically change reconstruction threshold (distance) 550, and reconstruction voxel size 555.

In the AR pipeline 500, a grid is overlayed or placed on the scene to be reconstructed. The grid size(i.e., size of a grid square in a grid) can affect the computation load. For example, according to this disclosure, a large grid size has wider spaced grid lines and fewer grid points per area corresponding to a lower resolution image. Conversely a smaller grid size has narrower grid lines and more grid points per area corresponds to a higher-resolution image. As such, a large grid size will cause fewer computations while a smaller grid size will cause increased computations That is, a smaller grid size, with more points, has a higher resolution than a large grid size having fewer points. Additionally, higher resolution images, such as 300 dots per inch (dpi) or more, will require more computation while lower resolution images will require less computation. In the reconstruction grid volume size 545, the processor 120 is configured to dynamically and adaptively vary a grid volume size (i.e., the density of grid points) by adjusting the grid size. As needed during processing, the processor 120 can adjust maximum dimensions of the scene to be reconstructed. Here, decreasing the grid volume size corresponds with increasing a spacing between the grid lines (i.e., increasing the grid size) and reducing the number of grid points. Additionally, increasing the grid volume size corresponds with reducing the spacing between grid lines (i.e., reducing the grid size) and increasing the number of grid points. Since decreasing the grid volume size (and correspondingly increasing the grid size and reducing the number of grid points) will reduce the computational loads and the needs for computational power and memory, the processor 120 is configured to increase the grid size for the image and, thus, reduce the resolution of the image such as from a high-resolution to a low-resolution, which in turn reduces computational load. When available computational resources are reduced, the processor 120 can reduce the reconstruction grid volume size (i.e., increasing the grid size and reducing the number of grid points) and balance the pipeline processing speed. When the computational resources are recovered, processor can return to the original designed grid volume size, such by decreasing the grid size (i.e., increasing the number of grid points) for the image to increase the resolution back to a higher resolution. A change of grid volume size 545 may reduce processing accuracy.

The processor 120 executing or including AR pipeline 500 is configured to adaptively change the distance 550 based on a truncation distance (also references as truncation range). Changes in a truncated distance will influence reconstruction range. Reducing the truncated distance will reduce the contents for reconstruction. Reducing the truncated distance will also reduce the requirements of computational resources. The changes in truncated distance 550 can balance computational loads with the updates of the voxels for corresponding processing speed of the AR pipeline 500.

The processor 120 is further configured to adaptively change a voxel size 555. A voxel is an array of elements of volume that constitute a 3D space. That is, a voxel can be seen as a cube space within a 3D image. The voxel (cube) is used to reconstruct an object within a 3D scene. If larger-sized voxels are used, few voxels are required to fit the scene. If smaller-sized voxels are used, more voxels are required to fit the scene. That is, for a given reconstruction grid volume size, increasing the voxel size will reduce the number of voxels and requirements of memory. Therefore, using larger-sized voxels decreases computational complexity and computation load while using smaller-sized voxels increase computational complexity and computation load. Accordingly, a change of voxel size 555 can influence memory requirements, reconstruction accuracy, and processing speed. A change of voxel size 555 will also reduce the computational cost for updating the TSDF 133 and for ray tracing (ray casting 540). A change of voxel size 555 may reduce processing accuracy. Therefore, when available computational resources are reduced, the processor 120 can increase the voxel size to balance the processing speed and memory by trading-off with processing accuracy. When the computational resources are recovered, the processor 12 can return to the original designed voxel size.

By trading-off between processing speed and result accuracy, the AR pipeline 500 can keep processing speed by sacrificing some accuracy when computational resources are reduced. The AR pipeline 500 can return to the normal processing speed and accuracy when available computational resources return to normal state. An additive-only TSDF 560 is created by considering only the voxels inside the truncation region to significantly reduce the computational loads and increase the processing speed. In conventional TSDF algorithms, when integrating, the conventional TSDF algorithm: 1) needs to mark all voxels in the truncation region around a given depth as occupied; and 2) needs to mark all voxels outside of this region (and within the camera frustum) as empty space. The AR pipeline 500 includes an adaptive TSDF process that is not required to mark all voxels outside of the truncation region (and within the camera frustum) as empty space. This makes the disclosed adaptive TSDF algorithm and pipeline an additive-only TSDF 560. The additive-only TSDF 560 reduces the runtime of integration to be linear in the RGBD image size, instead of linear in the voxel grid dimension. In the additive-only TSDF 560, instead of marking all the voxels in a scene, voxels are marked differently in different iterations. That is, in a first iteration, all voxels are marked as occupied or empty. In a second iteration, only the voxels within the truncated distance are marked. By processing only the voxels within the truncated distance, a processing speed. In one illustrative example, additive-only TSDF 560 can increase processing speed by up to eight (8) times.

In certain embodiments, changing the grid volume size 545 also changes the number of points on the grid. When the processor 120 changes the reconstruction grid volume size 545, the requirements from depth verification and noise reduction in operation 515 and surface normal calculation in operation 520 will change. The processor 120 processes the change in points on the grid in operations 515 and 520. By changing the grid volume size 545, the computation load of the depth verification and noise reduction in operation 515 and the computation load of the surface normal calculation in operation 520 are also changed accordingly. Increasing reconstruction volume size requires more depth points with surface normal and decreasing reconstruction volume size will need less depth points with surface normal. That is, increasing the grid size reduces the number of points on the grid, which further reduces the computation requirements for depth verification and noise reduction in operation 515 and the computation load of the surface normal calculation in operation 520. The processor 120 adaptively adjusts the points of depth verification and noise reduction in operation 515 and surface normal calculation in operation 520 to adjust computational loads.

As such, based on the depths and surface normal, as well as the reconstruction threshold (distance) 545, reconstruction grid volume size 550, reconstruction voxel size 555 and the additive-only TSDF 560, the processor 120 reconstructs the TSDF function 536, frustrum culling 539, data fusion 537, and integration 537, and outputs a 3D like injection model for rendering that will be used by ray casting 540. The processor 120 performs ray casting 540 for reconstructing and overlapping of the objects in the scene as well as culling the parts that cannot be seen in the view. The output of ray casting 540 is a real model has occlusion. That is, a face is identifiable as foreground or a background.

The results of ray casting 540 are further provided to pose tracking 526 and refining 528 to improve the camera pose in operation 525. That is, results of ray casting 540 are fed back to the camera pose 525. In operation 565, with the results of ray casting 540, the processor 120 renders the reconstructed 3D scene and sends the reconstructed 3D scene to display, such as display 160.

Figure 6:
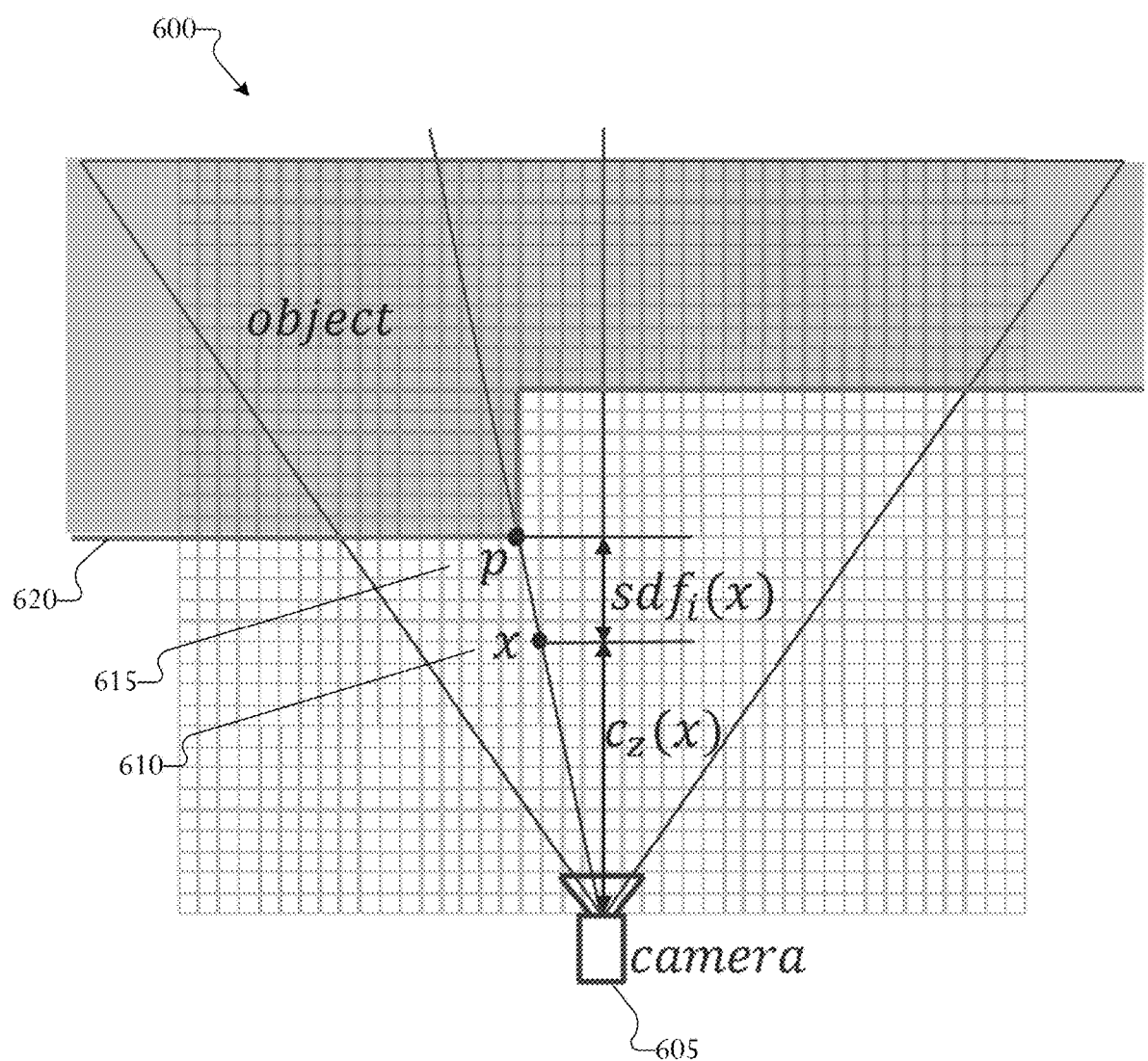
FIG. 6. illustrates example volume-based reconstruction with truncated signal distance field (TSDF) according to embodiments of the present disclosure.

FIG. 6. illustrates example volume-based reconstruction with TSDF according to embodiments of the present disclosure. The example of the volume-based reconstruction with TSDF 600 shown in FIG. 6 is for illustration only. Other examples could be used without departing from the scope of the present disclosure.

In the example shown in FIG. 6, a camera 605 is capturing image information. The camera 605 can be the same as, or similar to, camera 195 of FIG. 1. The camera 605 is at an initial pose. For an i-th observation, a signed distances fields (SDF) function can be defined according to:

$$sdf_i(x) = \text{depth}_i(p(x)) - C_z(x) \quad (1)$$

where, x 610 is the center of a voxel; p(x) is the projection of the voxel center x 610 onto the depth image; $\text{depth}_i(p(x))$ is the depth between the camera 605 and the nearest object surface point p 615 on the viewing ray crossing x; and $C_z(x)$ is the distance in between the voxel and the camera along the optical axis.

The truncated SDF is defined in a truncated range±t (distance) which is denoted by $tsdf_i(x)$.

$$tsdf_i(x) = \max\left(-1, \min\left(1, \frac{sdf_i(x)}{t}\right)\right) \quad (2)$$

Multiple observations are integrated into one TSDF, $$TSDF_i(x) = \frac{W_{i-1}(x) TSDF_{i-1}(x) + w_i(x) tsdf_i(x)}{W_{i-1}(x) + w_i(x)} \quad (3)$$

$$W_i(x) = W_{i-1}(x) + w_i(x) \quad (4)$$

where, $W_i(x)$ is a weight which assesses the uncertainty of $TSDF_i(x)$, and $w_i(x)$ is a weight that assesses the uncertainty of $tsdf_i(x)$.

In certain embodiments, the additive-only TSDF is created by only considering voxels in a truncation region to reduce computational loads and increate processing speed. A processor 120 in the electronic device 101 employing the AR pipeline 500 is configured to adaptively adjust computational loads corresponding to the changes of computational resources. When other processes require more computational power and the available computational resources are reduced for TSDF reconstruction, the processor 120 is configured to reduce the computational loads. When the available computational resources are recovered, the processor 120 returns to previous computational loads. In this way, the AR pipeline 500 is adapted to run smoothly. In certain embodiments, the processor 120 is configured to adaptively adjust the parameters of the TSDF reconstruction.

Figure 7:
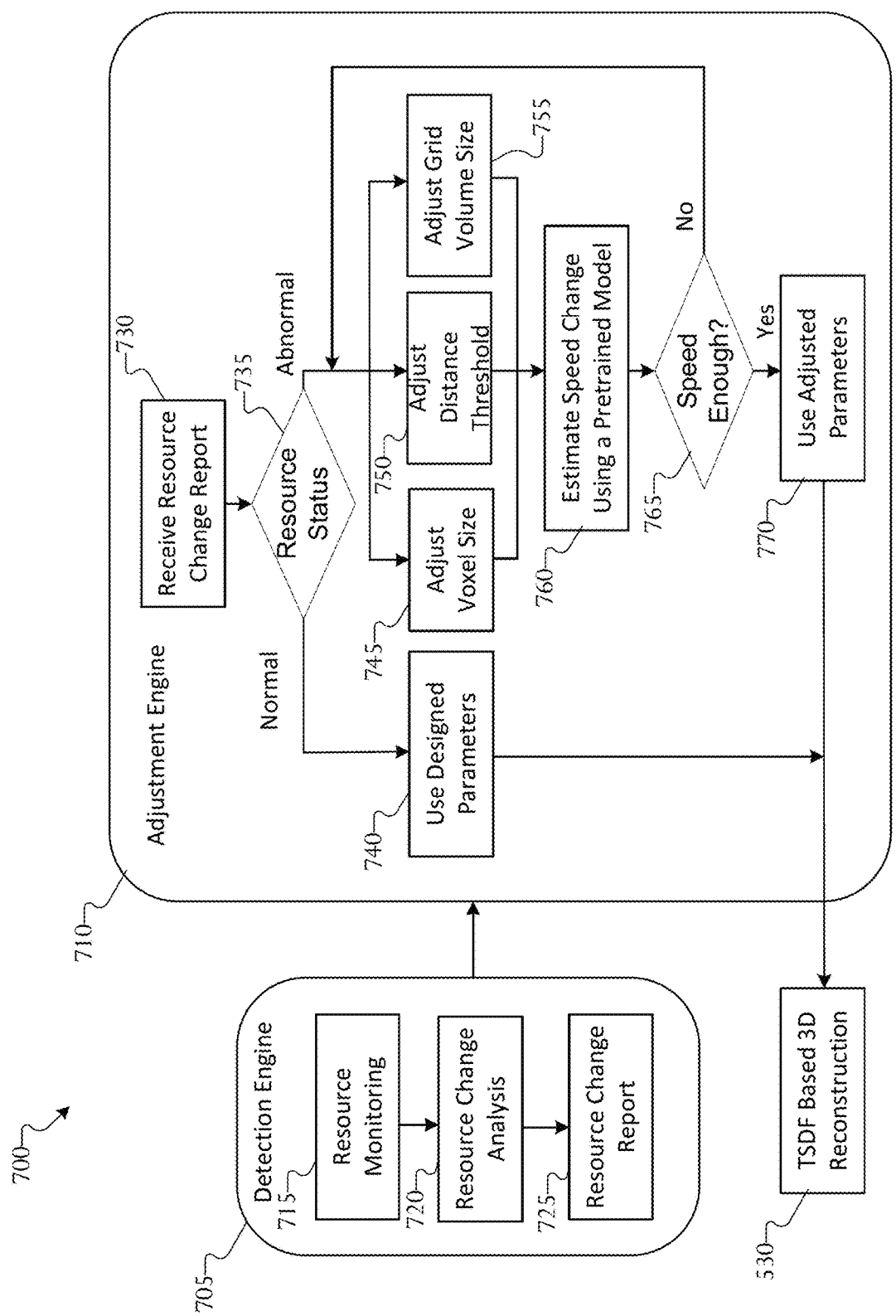
FIG. 7 illustrates a process for dynamically adjusting computational loads to fit available resources according to embodiments of the present disclosure.

FIG. 7 illustrates a process for dynamically adjusting computational loads to fit available resources according to embodiments of the present disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in a mobile electronic device, such as by one or more processors 120 of an electronic device 101.

In the example shown in FIG. 7, the process 700 is performed by a detection engine 705 and an adjustment engine 710. Each of the detection engine 705 and an adjustment engine 710 can be separate processing circuitry in electronic device 101. In certain embodiments, the detection engine 705, the adjustment engine 710, or both, are included in or implemented by one or more processors 120 in electronic device 101.

The detection engine 705 is configured to detect changes of available computational resources in AR pipeline 500. In certain embodiments, the detection engine 705 is configured to run on a backend thread for monitoring computational resources 710. For example, the detection engine 710 can monitor requests made by and allocations to processor 120. In certain embodiments, the detection engine 710 can compare the requests or allocations against a predetermined threshold value. In certain embodiments, the detection engine 705 is configured to monitor a heat generated by the processor 120, such as compared to a heat threshold value, to determine a processor load. The detection engine 705 also is configured to analyze changes of available resources 715. That is, based on the requests and allocations, the detection engine 705 can determine if the processor 120 is increasing a number of tasks or reducing a number of tasks. For example, if another application is opened, the detection engine 705 can identify one or more of an increase in memory calls, process allocations, or power consumption. The detection engine 705 then creates online report 720 and sends the report to the adjustment engine 710.

The adjustment engine 710 is configured to dynamically adjust one or more parameters of the TSDF based 3D reconstruction 530 to dynamically adjust computational loads of 3D reconstruction and compensate for changes in available computational resources. After receiving a resource change report 730 from the detection engine 705, the adjustment engine 710 executes one or more actions corresponding a status of available computational resource included in the resource change report 725.

In operation 735, the adjustment engine 710 determines whether the status of available computational resource in the resource status report is normal or abnormal. For example, the adjustment engine 735 can compare the status of available computational resource to one or more predetermined threshold values. In certain embodiments, the resource change report 725 includes a flag indicating whether or not the status of available computation resources is normal or abnormal. In certain embodiments, the resource change report 725 includes one or more indicators configured to indicate that the status of available computation resources is normal or abnormal. For example, the resource change report 725 can include a null value when the status of computational resources is normal. Alternatively, the resource change report 725 can include one or more of a heat value, message value, or allocation value when the respective value exceeds a threshold, indicating that the status of computation resources is abnormal.

When the status of available computational resource is normal, the adjustment engine 710 determines that no adjustment of computational loads of the processor 120 is required. The adjustment engine 710 uses the designed parameters in operation 740. The adjustment engine 710 then sends the designed parameters to TSDF based 3D reconstruction 530. In certain embodiments, the adjustment engine 710 sends a configuration message indicating for the TSDF based 3D reconstruction 530 to use designed (original or preset) parameters.

When the status of available computational resources is not normal, the adjustment engine 710 determines that an adjustment of the computational loads should be performed to compensate for the changes in the resources. The adjustment engine 710 can perform adjustment of the computational values by performing one or more of: adjusting voxel size 745, adjusting distance threshold 750, and adjusting a grid volume size 755.

When the adjustment engine 710 adjusts the voxel size 745, increasing voxel size can reduce the required number of voxels of volume reconstruction, such that the computational loads can be reduced. Increasing voxel size may result in a loss of some accuracy for volume reconstruction. In certain embodiments, a predefined voxel threshold is used to manage the adjustment of the voxel size. For example, the voxel threshold can limit the voxel adjustment to a maximum size. In certain embodiments, the voxel threshold can limit an amount by which the voxel is changed per iteration. In certain embodiments, the values of the voxel threshold can be dependent on the scene environment such as whether the scene is an indoor scene or an outdoor scene, a space, or one or more objects in the space.

When the adjustment engine 710 adjusts a distance threshold 750, the truncated range is changed. A larger distance will have larger truncated range and result in more computational loads, such that the reconstruction process may require more computational resources. To reduce computational loads, the adjustment engine 710 reduces the truncated range. In certain embodiments, a change in the distance threshold is dependent upon the environment in the scene. In certain embodiments, different distance threshold values are used for different environments in the scene. For example, a first distance threshold value can be used for outdoor scenes and a second distance threshold value can be used for indoor scenes.

When the adjustment engine 710 adjusts a grid volume size 755, the size and resolution of reconstruction areas is changed. A higher reconstruction resolution has more computational loads and requires more computational resources. To reduce computational loads, the adjustment engine 710 reduces the reconstruction resolution by reduces the number of grid points (i.e., increasing the grid size). Meanwhile, since the resolution changes, the number of depth points needed for reconstruction will also change. Therefore, the adjustment engine 710 also adjusts the points in depth verification and noise reduction 515 and surface normal calculation 520 for further adjustment of the computational loads.

After adjusting the computational loads by performing one or more of: adjusting voxel size 745, adjusting distance threshold 750, and adjusting a grid volume size 755, the adjustment engine 710 estimates a processing speed change using a pretrained model 760. In certain embodiments, a machine learning model is used to learn the relationship between the speed change and parameters changes in adjusting voxel size 745, adjusting distance threshold 750, and adjusting a grid volume size 755. After being trained, the pretrained model 760 is used to estimate the speed change. In operation 765, if the adjustment engine 710 determines that the estimated processing speed is fast enough to maintain proper operation of the AR pipeline 500, then the adjustment engine 710 determines that the adjusted parameters should be used in operation 770. The adjustment engine 710 then sends the adjusted parameters to the TSDF based 3D reconstruction 530. Alternatively, in operation 765, if the adjustment engine 710 determines that the estimated processing speed is not fast enough to maintain proper operation of the AR pipeline 500, the adjustment engine 710 again performs one or more of: adjusting voxel size 745, adjusting distance threshold 750, and adjusting a grid volume size 755. The adjustment engine 710 repeats performing one or more of: adjusting voxel size 745, adjusting distance threshold 750, and adjusting a grid volume size 755, until the estimated processing speed is fast enough to maintain proper operation of the AR pipeline 500. One or more processors in the electronic device 101 will do these adjustments automatically in AR pipeline 500.

Figure 8:
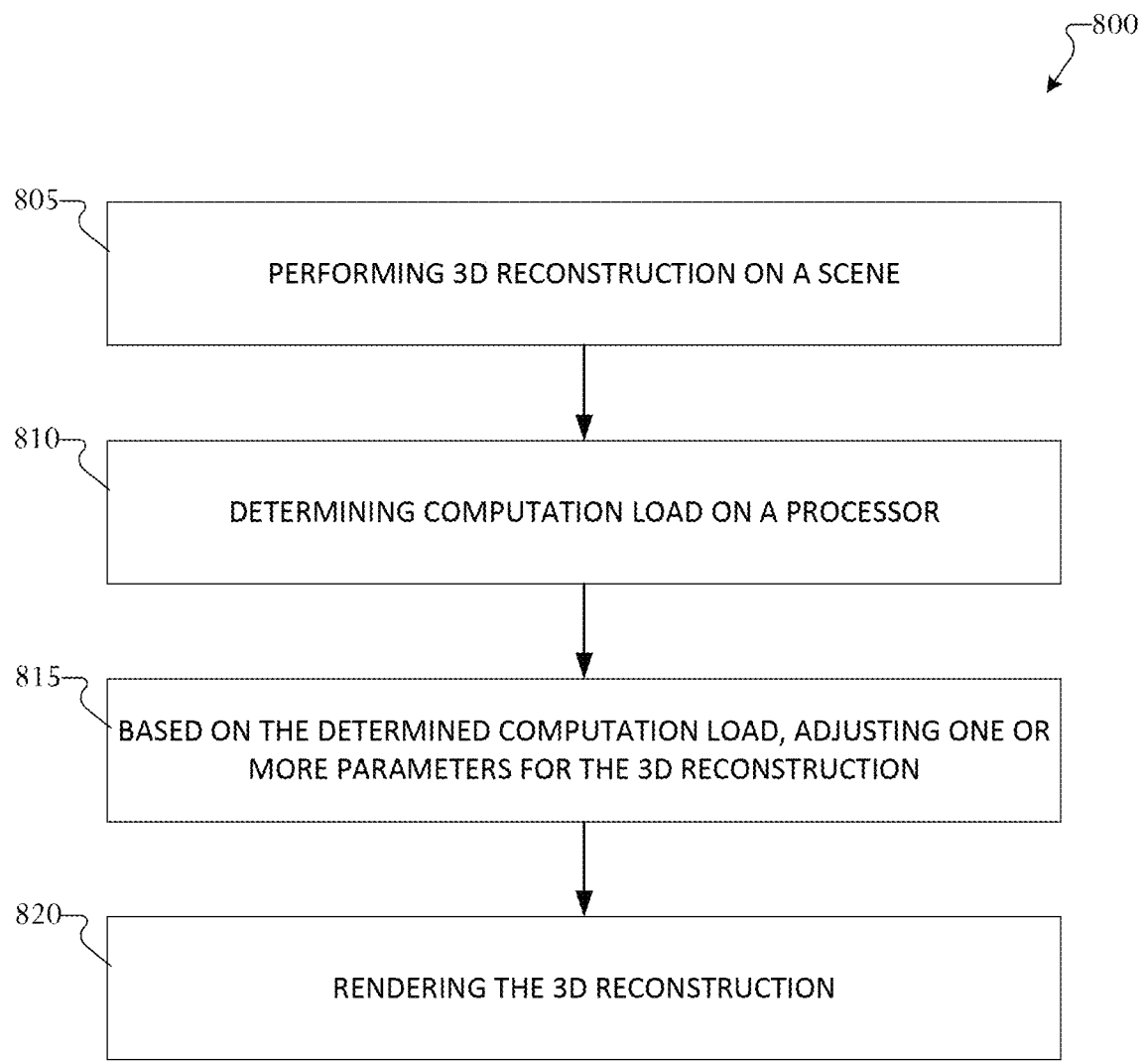
FIG. 8 illustrates a process for volume-based scene reconstruction for XR platform and applications according to embodiments of the present disclosure.

FIG. 8 illustrates a process for volume-based scene reconstruction for XR platform and applications according to embodiments of the present disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in a mobile electronic device, such as by one or more processors 120 of an electronic device 101.

In operation 805, the processor 120 performs a three-dimensional (3D) scene reconstruction for an extended reality application. The 3D scene reconstruction process can be an adaptive volume-based scene reconstruction for XR platform and applications. In the process for adaptive volume-based scene reconstruction for XR platform and applications, the processor 120 receives inputs comprising a color image and dense depth map, such as from other sources, to perform the 3D reconstruction.

In operation 810, the processor 120 determines a computation load. For example, the processor 120 can determine a current computation load of one or more processors of the electronic device 101 by one or more of: monitoring requests made by and allocations to processor 120; comparing the requests or allocations against a predetermined threshold value; monitoring a heat generated by the processor 120, such as compared to a heat threshold value, to determine a processor load; or analyzing changes of available resources 715.

In operation 815, based on the determined computation load, the processor 120 adjusts one or more parameters for the 3D scene reconstruction to compensate for the determined computation load. In certain embodiments, adjusting the one or more parameters for the 3D scene reconstruction comprises creating additive-only TSDF by only considering voxels in truncation region to reduce computational loads and increase processing speed in the integration process additive-only TSDF 560 and dynamically adjust computational loads to cooperate with running status of AR pipeline 500. When the available computational resources meet the requirements, the 3D scene reconstruction can take normal computational loads to generate results with expected accuracy. When the available computational resources are reduced, the process may require less computational loads and generate results with a lower-accuracy to balance the whole pipeline. In certain embodiments, the adjusting the one or more parameters for the 3D scene reconstruction comprises dynamically adjusting reconstruction voxel size for requirements of both processing speed and scene reconstruction accuracy in the reconstruction voxel size 555. In certain embodiments, the adjusting the one or more parameters for the 3D scene reconstruction comprises dynamically adjusting reconstruction distance from the objects in the scene to adjust the number of voxels needed to be updated, in reconstruction grid volume size 545, for balancing processing speed and computational loads. In certain embodiments, the adjusting the one or more parameters for the 3D scene reconstruction comprises dynamically adjusting reconstruction grid volume size for the requirements of both processing speed and memory consumption in adaptive change of distance 550. In certain embodiments, the adjusting the one or more parameters for the 3D scene reconstruction comprises adaptively adjusting number of depth points only required by the volume-based reconstruction process with reconstruction resolution changes to save computational resources. In certain embodiments, the adjusting the one or more parameters for the 3D scene reconstruction comprises adaptively computing surface normal for the points only required by the volume-based scene reconstruction process with reconstruction resolution changes to save computational resources.

In operation 820, a reconstructed 3D scene is rendered.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:
1. A method comprising:
performing, by at least one processor of an electronic device, a three-dimensional (3D) scene reconstruction for an extended reality application;
determining a processor computation load;
based on the determined computation load, adjusting one or more parameters for the 3D scene reconstruction such that a processing speed of the 3D scene reconstruction is maintained while accuracy or resolution of the 3D scene reconstruction is reduced to compensate for the determined computation load, wherein adjusting the one or more parameters for the 3D scene reconstruction comprises:
creating an additive-only truncated signed distance function (TSDF) that considers only voxels in a truncation region of a 3D image while ignoring voxels outside the truncation region in order to at least one of reduce the computation load or increase processing speed in an integration process of the 3D scene reconstruction; and
dynamically adjusting a reconstruction voxel size to adjust a number of voxels in the 3D scene reconstruction based on the computation load; and
rendering a reconstructed 3D scene;
wherein creating the additive-only TSDF comprises performing an iterative process in which (i) during a first iteration, all of the voxels of the 3D image are marked as one of empty or occupied and (ii) in one or more subsequent iterations, only the voxels in the truncation region of the 3D image are considered while voxels outside the truncation region are ignored.

2. The method of claim 1, wherein adjusting the one or more parameters for the 3D scene reconstruction further comprises:
dynamically adjusting a reconstruction distance from one or more objects in the 3D image to adjust a number of voxels to be updated.

3. The method of claim 1, wherein adjusting the one or more parameters for the 3D scene reconstruction further comprises:
dynamically adjusting a reconstruction grid volume size to adjust dimensions of a scene to be reconstructed.

4. The method of claim 1, wherein adjusting the one or more parameters for the 3D scene reconstruction further comprises:
adaptively adjusting a number of depth points required by a volume-based 3D scene reconstruction process with reconstruction resolution changes; and
adaptively computing a surface normal for a reduced number of depth points required by the volume-based 3D scene reconstruction process.

5. The method of claim 1, wherein adjusting the one or more parameters for the 3D scene reconstruction further comprises:
when available computational resources meet a predetermined requirement, setting the one or more parameters to an initial value to enable the 3D scene reconstruction to utilize a predetermined computation load; and
when the available computational resources are less than the predetermined requirement, setting the one or more parameters to cause the 3D scene reconstruction to utilize a reduced computation load; and
wherein the electronic device comprises one of:
a virtual display device; or
an optical see-through (OST) augmented reality (AR) headset.

6. The method of claim 1, wherein the integration process of the 3D scene reconstruction comprises:
performing frustrum culling on voxels that are not visible in the reconstructed 3D scene to increase a speed of the integration process.

7. An apparatus, comprising:
an image sensor; and
at least one processor configured to:
perform a three-dimensional (3D) scene reconstruction for an extended reality application;
determine a processor computation load;
based on the determined computation load, adjust one or more parameters for the 3D scene reconstruction such that a processing speed of the 3D scene reconstruction is maintained while accuracy or resolution of the 3D scene reconstruction is reduced to compensate for the determined computation load, wherein, to adjust the one or more parameters for the 3D scene reconstruction, the at least one processor is configured to:
create an additive-only truncated signed distance function (TSDF) that considers only voxels in a truncation region of a 3D image while ignoring voxels outside the truncation region in order to at least one of reduce the computation load or increase processing speed in an integration process of the 3D scene reconstruction; and
dynamically adjust a reconstruction voxel size to adjust a number of voxels in the 3D scene reconstruction based on the computation load; and
render a reconstructed 3D scene;
wherein, to create the additive-only TSDF, the at least one processor is configured to perform an iterative process in which (i) during a first iteration, all of the voxels of the 3D image are marked as one of empty or occupied and (ii) in one or more subsequent iterations, only the voxels in the truncation region of the 3D image are considered while voxels outside the truncation region are ignored.

8. The apparatus of claim 7, wherein, to adjust the one or more parameters for the 3D scene reconstruction, the at least one processor is further configured to:
dynamically adjust a reconstruction distance from one or more objects in the 3D image to adjust a number of voxels to be updated.

9. The apparatus of claim 7, wherein, to adjust the one or more parameters for the 3D scene reconstruction, the at least one processor is further configured to:
dynamically adjust a reconstruction grid volume size to adjust dimensions of a scene to be reconstructed.

10. The apparatus of claim 7, wherein, to adjust the one or more parameters for the 3D scene reconstruction, the at least one processor is further configured to:
adaptively adjust a number of depth points required by a volume-based 3D scene reconstruction process with reconstruction resolution changes; and
adaptively compute a surface normal for a reduced number of depth points required by the volume-based 3D scene reconstruction process.

11. The apparatus of claim 7, wherein, to adjust the one or more parameters for the 3D scene reconstruction, the at least one processor is further configured to:
when available computational resources meet a predetermined requirement, set the one or more parameters to an initial value to enable the 3D scene reconstruction to utilize a predetermined computation load; and
when the available computational resources are less than the predetermined requirement, set the one or more parameters to cause the 3D scene reconstruction to utilize a reduced computation load; and
wherein the apparatus comprises one of:
a virtual display device; or
an optical see-through (OST) augmented reality (AR) headset.

12. The apparatus of claim 7, wherein the at least one processor is further configured to:
perform frustrum culling on voxels that are not visible in the reconstructed 3D scene to increase a speed of the integration process of the 3D scene reconstruction.

13. A non-transitory computer-readable medium containing instructions that, when executed by at least one processor, cause the at least one processor to:
perform a three-dimensional (3D) scene reconstruction for an extended reality application;
determine a processor computation load;
based on the determined computation load, adjust one or more parameters for the 3D scene reconstruction such that a processing speed of the 3D scene reconstruction is maintained while accuracy or resolution of the 3D scene reconstruction is reduced to compensate for the determined computation load, wherein the instructions that when executed cause the at least one processor to adjust the one or more parameters for the 3D scene reconstruction comprise instructions that when executed cause the at least one processor to:
create an additive-only truncated signed distance function (TSDF) that considers only voxels in a truncation region of a 3D image while ignoring voxels outside the truncation region in order to at least one of reduce the computation load or increase processing speed in an integration process of the 3D scene reconstruction; and dynamically adjust a reconstruction voxel size to adjust a number of voxels in the 3D scene reconstruction based on the computation load; and render a reconstructed 3D scene;

wherein the instructions that when executed cause the at least one processor to create the additive-only TSDF comprise instructions that when executed cause the at least one processor to perform an iterative process in which (i) during a first iteration, all of the voxels of the 3D image are marked as one of empty or occupied and (ii) in one or more subsequent iterations, only the voxels in the truncation region of the 3D image are considered while voxels outside the truncation region are ignored.

14. The non-transitory computer-readable medium of claim 13, wherein the instructions that when executed cause the at least one processor to adjust the one or more parameters for the 3D scene reconstruction further comprise instructions that when executed cause the at least one processor to:

dynamically adjust a reconstruction distance from one or more objects in the 3D image to adjust a number of voxels to be updated.

15. The non-transitory computer-readable medium of claim 13, wherein the instructions that when executed cause the at least one processor to adjust the one or more parameters for the 3D scene reconstruction further comprise instructions that when executed cause the at least one processor to:

dynamically adjust a reconstruction grid volume size to adjust dimensions of a scene to be reconstructed.

16. The non-transitory computer-readable medium of claim 13, wherein the instructions that when executed cause the at least one processor to adjust the one or more parameters for the 3D scene reconstruction further comprise instructions that when executed cause the at least one processor to:

adaptively adjust a number of depth points required by a volume-based 3D scene reconstruction process with reconstruction resolution changes; and adaptively compute a surface normal for a reduced number of depth points required by the volume-based 3D scene reconstruction process.

17. The non-transitory computer-readable medium of claim 13, wherein the instructions when executed further cause the at least one processor to:

perform frustrum culling on voxels that are not visible in the reconstructed 3D scene to increase a speed of the integration process of the 3D scene reconstruction.

* * * * *